US008903456B2

(12) United States Patent
Chu et al.

(10) Patent No.: US 8,903,456 B2
(45) Date of Patent: Dec. 2, 2014

(54) WIRELESS CHARGING METHOD AND APPARATUS

(75) Inventors: Inchang Chu, Seoul (KR); Jinmoo Park, Seoul (KR)

(73) Assignee: LG Electronics Inc., Seoul (KR)

(*) Notice: Subject to any disclaimer, the term of this patent is extended or adjusted under 35 U.S.C. 154(b) by 111 days.

(21) Appl. No.: 13/212,914

(22) Filed: Aug. 18, 2011

(65) Prior Publication Data

US 2012/0214462 A1    Aug. 23, 2012

Related U.S. Application Data

(60) Provisional application No. 61/444,477, filed on Feb. 18, 2011.

(51) Int. Cl.
*H04B 1/38* (2006.01)
*H04M 19/04* (2006.01)
*H04M 1/725* (2006.01)
*H02J 7/02* (2006.01)

(52) U.S. Cl.
CPC .......... *H04M 1/72569* (2013.01); *H04M 19/04* (2013.01); *H02J 7/025* (2013.01)
USPC ..................... 455/567; 455/343.2; 455/343.3; 455/343.4; 455/343.5; 455/550.1; 455/566; 455/569.1; 455/572; 455/573; 455/574; 370/311; 320/106; 320/108; 320/114; 379/433.08

(58) Field of Classification Search
CPC ............ H04M 1/72519; H04M 19/04; H04M 1/6066; H04M 1/0262; H04M 1/3883; H04W 52/02; H04W 52/0229; H04W 52/0216; H04W 52/0245; C22C 38/32; C22C 38/44

USPC ........... 455/550.1, 566, 567, 569.1, 572, 573, 455/574, 343.2–343.5; 370/311; 320/106, 320/108, 114; 379/433.08

See application file for complete search history.

(56) References Cited

U.S. PATENT DOCUMENTS

| | | | | |
|---|---|---|---|---|
| 4,495,383 | A * | 1/1985 | Lubin et al. | 379/388.01 |
| 5,596,567 | A * | 1/1997 | deMuro et al. | 320/106 |
| 5,963,012 | A * | 10/1999 | Garcia et al. | 320/106 |
| 6,118,249 | A * | 9/2000 | Brockmann et al. | 320/108 |
| 6,271,764 | B1 | 8/2001 | Okamura | |
| 6,983,169 | B2 * | 1/2006 | Vogel et al. | 455/550.1 |
| 7,375,493 | B2 * | 5/2008 | Calhoon et al. | 320/108 |
| 7,493,148 | B2 * | 2/2009 | Ha et al. | 455/573 |
| 7,639,514 | B2 * | 12/2009 | Baarman | 363/16 |
| 7,705,565 | B2 * | 4/2010 | Patino et al. | 320/150 |
| 7,844,306 | B2 * | 11/2010 | Shearer et al. | 455/573 |

(Continued)

FOREIGN PATENT DOCUMENTS

| | | |
|---|---|---|
| GB | 2 353 186 A | 2/2001 |
| JP | 10-178468 A | 6/1998 |
| JP | 2000-358085 A | 12/2000 |
| JP | 2001-197674 A | 7/2001 |

(Continued)

*Primary Examiner* — Steve D Agosta
(74) *Attorney, Agent, or Firm* — Birch, Stewart, Kolasch & Birch, LLP

(57) ABSTRACT

A terminal can include a wireless charger configured to wirelessly receive a power signal from a charging pad to charge power; and a controller configured to control an incoming call notification mode to be changed from a vibration mode to a bell sound mode or silent mode when an event is generated on the charging pad.

7 Claims, 9 Drawing Sheets

(56) References Cited

U.S. PATENT DOCUMENTS 7,868,591 B2 * 1/2011 Phillips et al. ................. 320/114
7,979,061 B2 * 7/2011 McCarthy et al. ............ 455/418
2010/0036773 A1 * 2/2010 Bennett ........................... 705/67

FOREIGN PATENT DOCUMENTS

| KR | 10-2004-0028170 A | 4/2004 |
| KR | 10-2004-0099910 A | 12/2004 |
| WO | WO 2010/131776 A1 | 11/2010 |

* cited by examiner

WIRELESS CHARGING METHOD AND APPARATUS

This application claims the benefit of U.S. Provisional Application No. 61/444,477, filed on Feb. 18, 2011, which is hereby incorporated by reference for all purposes as if fully set forth herein.

BACKGROUND OF THE INVENTION

1. Field of the Invention

The present disclosure relates to a wireless charging method, and more particularly, to a wireless charging method and apparatus for changing a vibration mode to a bell sound mode or silent mode during wireless charging in a terminal.

2. Description of the Related Art

As a terminal such as a personal computer, a laptop computer, a portable phone, and the like has various functions, it is implemented as a multimedia player having complex functions such as capturing still or moving images, playing music or video files, playing games, receiving broadcast and the like.

Terminals can be classified into a mobile terminal and a stationary terminal based on its mobility. Furthermore, terminals can be further classified into a handheld terminal and a vehicle mount terminal based on whether or not the terminal can be directly carried by a user.

A battery is typically used for portability in such a terminal. Battery charging methods can be classified into wired charging and wireless charging, and the wired charging is widely used. However, in recent years, there is an increased interest in wireless charging technologies.

The wireless charging method can be classified into an electromagnetic induction type using an electromagnetic induction phenomenon and a magnetic resonance type for transmitting power at the same frequency to both transmitting and receiving ends. Among the wireless charging methods, the electromagnetic induction type charges a battery by applying power to a charging pad including a coil therein and using an induced current generated in a coil included in the battery of the terminal due to an electromagnetic field generated from the coil located inside the charging pad.

SUMMARY OF THE INVENTION

An object of the present disclosure is to provide a wireless charging method and apparatus for changing a vibration mode that has been set in the terminal to a bell sound mode or silent mode while performing a wireless charging operation.

A terminal according to the present disclosure can include a wireless charger configured to wirelessly receive a power signal from a charging pad to charge power; and a controller configured to control an incoming call notification mode to be changed from a vibration mode to a bell sound mode or silent mode when an event is generated on the charging pad.

Furthermore, the terminal can further include a display unit, such that the controller controls the display unit to display a display window for changing the incoming call notification mode.

Furthermore, the event generation can be any one of an incoming call reception, a message reception, and a wireless charging start.

Furthermore, the wireless charger can charge power through an induction method or resonance method.

Furthermore, the terminal can further include a wireless communication unit, such that the controller controls the wireless communication unit to change the incoming call notification mode to a silent mode and transmit a message for notifying the event generation to the charging pad.

Furthermore, the message can be transmitted to the charging pad through a Bluetooth communication method.

Furthermore, the controller can control the wireless communication unit to receive a response to the message from the charging pad.

Furthermore, the controller can control a speaker phone to be activated when receiving a response to the message from the charging pad, and the event generation can be an incoming call reception.

Furthermore, the controller can control the changed bell sound mode or silent mode to be restored to the vibration mode when wireless charging through the charging pad has been completed.

Furthermore, a surface shape of the charging pad can be a curve shape capable of containing the terminal.

In addition, a wireless charging method according to the present disclosure can include wirelessly receiving a power signal from a charging pad; changing an incoming call notification mode from a vibration mode to a bell sound mode or silent mode when an event is generated on the charging pad; and wirelessly charging a battery using the received power signal.

Furthermore, the wireless charging method can further include displaying a display window for changing the incoming call notification mode.

Furthermore, the event generation can be any one of an incoming call reception, a message reception, and a wireless charging start.

Furthermore, that wirelessly charging a battery can charge power through an induction method or resonance method.

Furthermore, the wireless charging method can further include changing the incoming call notification mode to a silent mode and transmitting a message for notifying the event generation to the charging pad.

Furthermore, the wireless charging method can further include receiving a response to the message from the charging pad.

Furthermore, the wireless charging method can further include activating a speaker phone when the event generation is an incoming call reception.

Furthermore, the wireless charging method can further include restoring the changed bell sound mode or silent mode to the vibration mode when wireless charging through the charging pad has been completed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile terminal associated with the present invention will be described in more detail with reference to the accompanying drawings. The suffixes "module" and "unit or portion" for constituent elements used in the following description merely provided only for facilitation of preparing this specification, and thus they are not granted a specific meaning or function.

A mobile terminal disclosed herein can include a portable phone, a smart phone, a laptop computer, a digital broadcast terminal, a personal digital assistant (PDA), a portable multimedia player (PMP), a navigation system, and the like.

However, it would be easily understood by those skilled in the art that a configuration according to embodiments disclosed herein can be also applicable to a stationary terminal such as a digital TV, a desktop computer, and the like.

Wireless Charging System

Figure 1A:
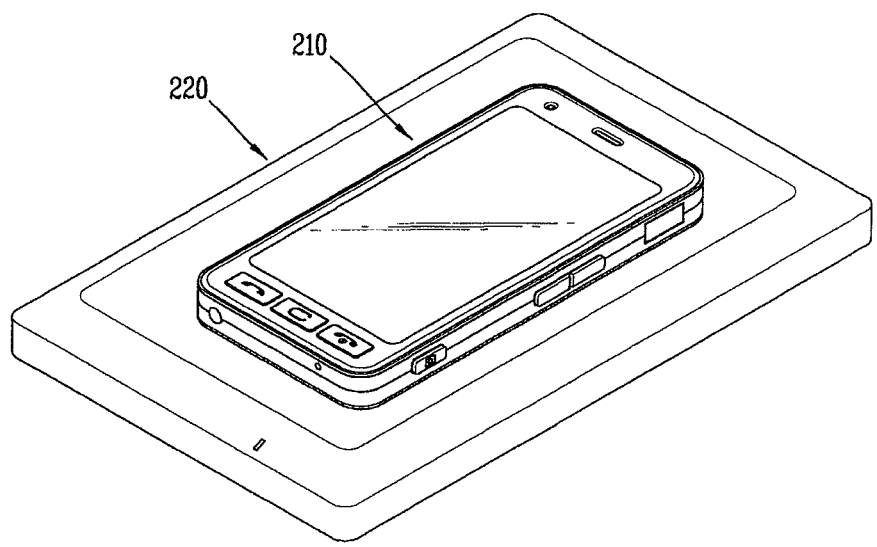
FIG. 1A is a conceptual view of the wireless charging system.
Figure 1B:
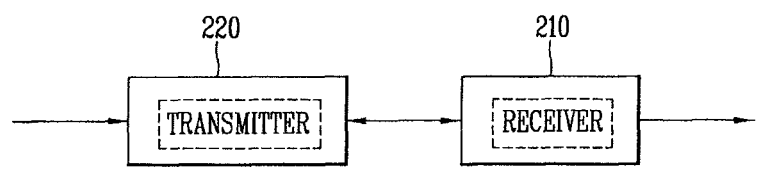
FIG. 1B is a block diagram of the wireless charging system.

FIG. 1 is a view illustrating a wireless charging system according to an embodiment of the present disclosure. FIG. 1A is a conceptual view of the wireless charging system, and FIG. 1B is a block diagram of the wireless charging system.

Referring to FIG. 1A, a wireless charging system can include a mobile terminal (or wireless charging apparatus) 210 and a charging pad 220. The mobile terminal 210 as a terminal capable of performing wireless charging can receive wireless power from the charging pad 220 to charge a battery. For example, the mobile terminal 210 can charge a battery based on inductive coupling generated from the charging pad 220. Furthermore, the mobile terminal 210 can charge a battery based on the coupling of a plane wave radiated from the charging pad 220.

Referring to FIG. 1B, the mobile terminal 210 is coupled with an induced current or plane wave radiation field (f) to generate an output power (p). The mobile terminal 210 and charging pad 220 can be separated by a predetermined distance (d). The charging pad 220 can further include a transmitting antenna for providing an energy transmission means, and the mobile terminal 210 can further include a receiving antenna (a2) for providing an energy reception means.

Wireless Charging by Induction Method

Wireless charging by an induction method is a technology for transmitting power using a primary coil and a secondary coil, which represents wireless charging using the principle of an electromagnetic induction method for inducing a current through an electromagnetic field from a coil to another coil.

Figure 2A:
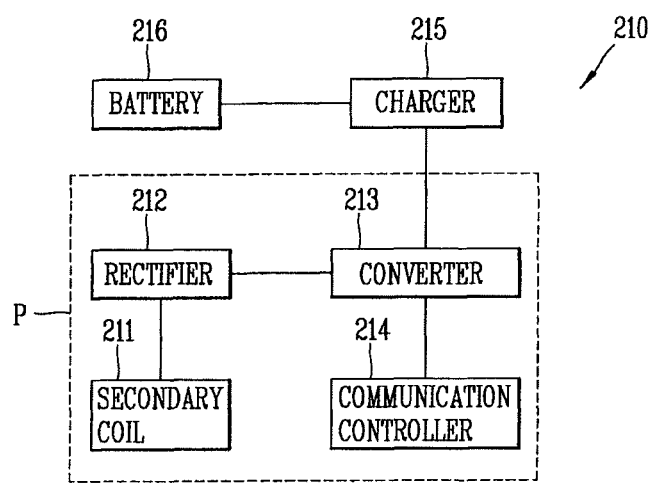
FIG. 2A is a block diagram of the wireless charging apparatus.
Figure 2B:
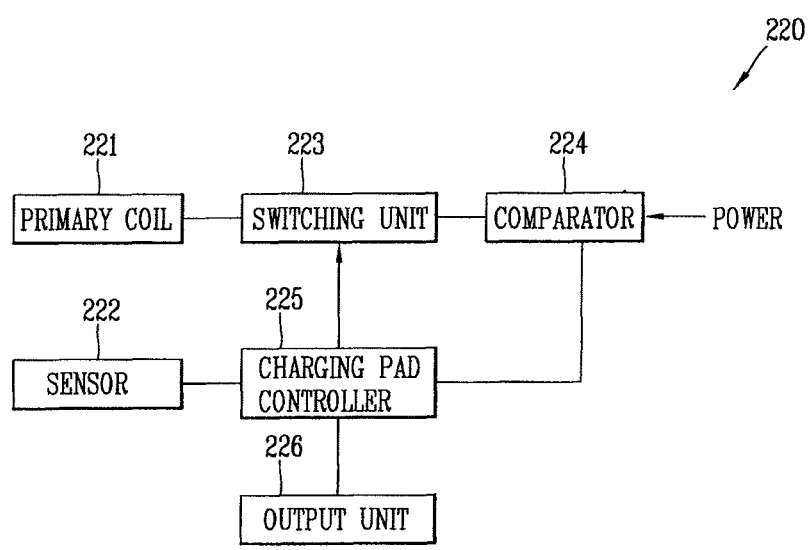
FIG. 2B is a block diagram of the charging pad.

FIG. 2 is a block diagram illustrating a wireless charging apparatus 210 and a charging pad 220 for performing a wireless charging operation using an induction method according to an embodiment of the present disclosure, FIG. 2A is a block diagram of the wireless charging apparatus, and FIG. 2B is a block diagram of the charging pad.

The wireless charging apparatus 210 can charge a battery using an induced current generated from the charging pad 220. The wireless charging apparatus can be a mobile terminal or an apparatus provided in a mobile terminal, or can be an apparatus separated from the mobile terminal.

When the wireless charging apparatus is a mobile terminal or an apparatus provided in the mobile terminal, it will be described later with reference to FIG. 4.

The charging pad 220 as an apparatus for wirelessly charging a battery in the wireless charging apparatus 210, which is a power transmitter for transmitting power used to charge the battery.

Referring to FIG. 2A, a wireless charging apparatus can include a secondary coil 211, a rectifier 212, a converter 213, a communication controller 214, a charger 215, and a battery 216. Here, the secondary coil 211, rectifier 212, converter 213, and communication controller 214 are commonly referred to as a power receiver (P). The power receiver (P) performs the function of receiving an induced current generated from the charging pad 220.

The secondary coil 211 creates an induced current according to the change of an electromagnetic field generated from a primary coil 221 of the charging pad 220. The primary coil 221 receives an induced current generated from the primary coil 221 to generate an induced current.

The rectifier 212 is an AC-DC converter for converting an induced current received through the secondary coil 211 into a direct current power (direct current voltage or direct current power).

The converter 213 converts a direct current power output from the rectifier 212 into a predetermined voltage. In other words, the converter 213 performs the function of converting the direct current power into a suitable voltage for battery charging. For example, if the direct current power output through the rectifier 212 is 9V, then the converter 213 converts 9V into 5V.

The communication controller 214 performs communication with the charging pad 220. The communication controller 214 can request authentication to the charging pad 220 whether or not the relevant terminal is a chargeable device. During the authentication request, the communication controller 214 can transmit identification information such as a device number of the battery or the like to the charging pad 220.

The charger 215 charges the battery 216 using an induced current received through the secondary coil 211. In other words, the charger 215 supplies an induced current created from the secondary coil 211 by electromagnetic field induction phenomenon generated from the charging pad to the battery 216. The charger 215 can include a charging circuit for controlling a battery charging operation, and an overcurrent and overvoltage protection circuit for protecting an overcurrent and an overvoltage.

Referring to FIG. 2B, the charging pad 220 can include a primary coil 221, a sensor 222, a switching unit 223, a comparison unit 224, a charging pad controller 225, and an output unit 226.

The primary coil 221 can generate an electromagnetic field when power is applied. The primary coil 221 can be implemented by a solenoid. Furthermore, an electromagnetic field generated from the primary coil 221 induces a magnetic field to the secondary coil 211 of the wireless charging apparatus 210 to generate an induced current on the secondary coil 211.

The sensor 222 can detect a contact of the wireless charging apparatus 210 when placed on the wireless charging apparatus 210 at an upper portion of the charging pad 220, and check the location of the wireless charging apparatus 210 on the charging pad 220.

Furthermore, the sensor 222 allows the wireless charging apparatus 210 to be disposed at a position having the highest charging efficiency when the wireless charging apparatus 210 is placed on the charging pad 220. When the wireless charging apparatus 210 is placed on the charging pad 220, it has the highest efficiency when a center of the primary coil 221 is located in a straight line with a center of the secondary coil 211.

Accordingly, a magnet can be provided at the center of the primary coil 221 to allow the centers of the primary coil 221 secondary coil 211 to be located in a straight line with each other, and therefore, if the center of the secondary coil 211 is located within a predetermined radius with respect to the center of the primary coil 221, then the wireless charging apparatus is drawn by a magnetic force, thereby allowing the centers of the primary coil 221 and secondary coil 211 to be located in a straight line with each other.

Here, if a distance between the centers of the primary coil 221 and secondary coil 211 is out of the allowable tolerance range (D), then the charging pad 220 recognizes that the wireless charging apparatus 210 does not satisfy the alignment condition, thereby transmitting a signal notifying that wireless charging is not enabled to the wireless charging apparatus 210.

In other words, if a distance between the centers of the primary coil 221 and secondary coil 211 does not satisfy the alignment condition when the centers of the primary coil 221 and secondary coil 211 are overlapped with each other, then wireless charging of the charging pad 220 will not be allowed for a battery. At this time, the charging pad 220 can transmit information on direction and distance by which the center of the secondary coil 211 of the wireless charging apparatus 210 is deviated with respect to the center of the primary coil 221.

The switching unit 223 performs the function of supplying or cutting off externally supplied power to or from the primary coil 221.

The comparison unit 224 is provided to check whether or not the charging pad 220 is normally operated by detecting a voltage or current of the externally supplied power and checking whether the detected voltage or current exceeds a threshold value. The comparison unit 224 can include a resistor for detecting a voltage of current of the externally supplied power and a comparator for comparing a voltage value or current value of the detected power with a threshold value to output the comparison result.

For example, the comparator 224 checks whether an externally applied power exceeds 5V and outputs the check result to the charging pad controller 225. If the externally applied power exceeds 5V, then the charging pad controller 225 controls the switching unit 223 to cut off power applied to the secondary coil 211.

The charging pad controller 225 controls the 223 according to the check result received from the comparator 224. Furthermore, the charging pad controller 225 performs communication with the wireless charging apparatus 210 to check a charged status of the battery through the communication. For example, the charging pad controller 225 performs communication with the wireless charging apparatus 210 through short-range communication such as Bluetooth.

Furthermore, the charging pad 220 can charge a plurality of wireless charging apparatuses at the same time.

In other words, two or more wireless charging apparatuses can be placed on the charging pad 220 to be charged, and different types of wireless charging apparatuses can be used. For example, a mobile phone, a multimedia player, a PDA, and the like can be placed on the charging pad 220 to perform wireless charging.

The output unit 226 displays a charged state under the control of the charging pad controller 225. The output unit 226 can be implemented by a light-emitting device and/or a liquid crystal display (LCD), and the like.

Wireless Charging by Resonance Method

First, resonance will be described.

Resonance refers to a phenomenon in which an amplitude of vibration is remarkably increased when periodically receiving an external force having the same frequency as the natural frequency of a system. Resonance is a phenomenon occurring at all kinds of vibrations such as mechanical vibration, electric vibration, and the like. It is called resonance in reference to electrical resonance. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, resulting in a reduced resistance between the plurality of vibrating bodies. In an electrical circuit, a resonator can be made by using a coil and a condenser. A resonator can be widely used as the meaning of a resonant device, but in the common sense, it refers to electromagnetic wave or electrical vibration. In an electrical circuit, the resonator can be used as a circuit for selecting a specific frequency among frequencies received by an antenna.

Figure 3A:
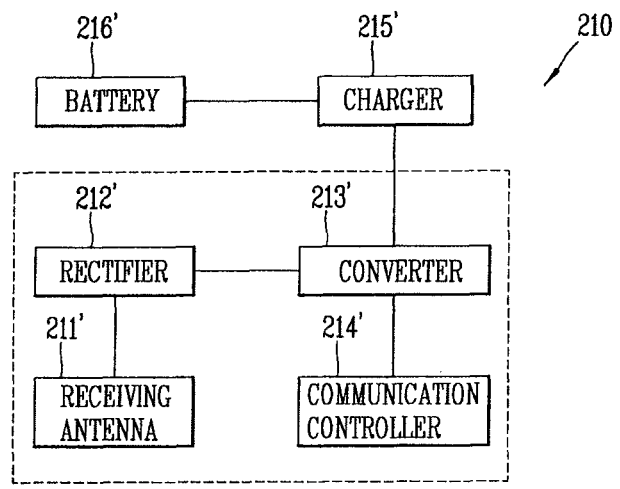
FIG. 3A is a block diagram of the wireless charging apparatus.
Figure 3B:
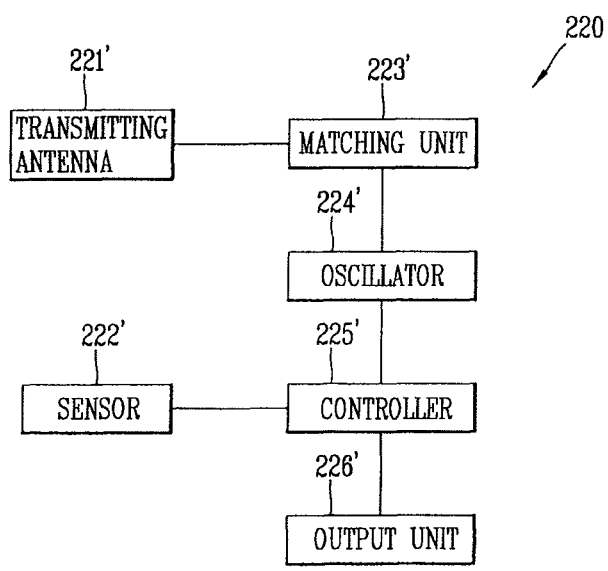
FIG. 3B is a block diagram of the charging pad.

FIG. 3 is a block diagram illustrating a wireless charging apparatus 210 and a charging pad 220 for performing a wireless charging operation using a resonance method according to another embodiment of the present disclosure, FIG. 3A is a block diagram of the wireless charging apparatus, and FIG. 3B is a block diagram of the charging pad.

The wireless charging apparatus 210 can charge a battery using the coupling of a plane wave radiated from the charging pad 220. The wireless charging apparatus can be a mobile terminal or an apparatus provided in a mobile terminal, or can be an apparatus separated from the mobile terminal.

When the wireless charging apparatus is a mobile terminal or an apparatus provided in the mobile terminal, it will be described later with reference to FIG. 4.

Referring to FIG. 3A, the wireless charging apparatus 210 can include a receiving antenna 211', a matching unit 212', a rectifier and switching circuit 213', a communication controller 214', a charger 215, and a battery 216'.

The matching unit 212' and rectifier and switching circuit 213' can generate a DC power output to charge the battery 216'.

Referring to FIG. 3A, the wireless charging apparatus can include a receiving antenna 211', a rectifier 212', a converter 213', a communication controller 214', a charger 215, and a battery 216'. Here, the receiving antenna 211', rectifier 212', converter 213', and communication controller 214' can be commonly referred to as a power receiver (Q). Generally, energy is wirelessly propagated to the receiving antenna 211', and then coupled with the mobile terminal 100 through the power receiver (Q).

The receiving antenna 211' is tuned to resonate at or adjacent to the same frequency as the transmitting antenna.

The rectifier 212 rectifies a RF energy signal received from the receiving antenna 211' to a non-alternating current power.

The converter 213' converts the rectified RF energy signal into an energy potential (for example, voltage) compatible to the mobile terminal 100.

The communication controller 214' performs communication with the charging pad 220. The communication controller 214' can request authentication to the charging pad 220 whether or not the relevant terminal is a chargeable device. During the authentication request, the communication controller 214' can transmit identification information such as a device number of the battery or the like to the charging pad 220.

The charger 215' charges the battery 216 using a RF energy signal received through the receiving antenna 211'. In other words, the charger 215' supplies a RF energy signal generated from the charging pad to the battery 216' by converting it into a form that can be used in the mobile terminal 100. The charger 215' can include a charging circuit for controlling a battery charging operation, and an overcurrent and overvoltage protection circuit for protecting an overcurrent and an overvoltage.

Referring to FIG. 3B, the charging pad 220 can include a transmitting antenna 221', a sensor 222', a matching unit 223', an oscillator 224', and a charging pad controller 225'. The charging pad 220 can further include an output unit 226'.

The transmitting antenna 221' is tuned to resonate at or adjacent to the same frequency as the receiving antenna.

The sensor 222' can detect whether or not there exist active receivers in the neighborhood of a near field generated by the transmitting antenna. For example, the sensor monitors any current affected by the existence or non-existence of active receivers in the neighborhood of a near field generated by the transmitting antenna. The detection is monitored by the controller to be used when determining whether the oscillator is to be enabled to transmit energy for the purpose of communicating with the mobile terminal 100.

The matching unit 223' induces a RF signal as determined by the oscillator and reduces harmonic emissions to a level for preventing the self-jamming of the devices coupled with the mobile terminal 100, and allows an impedance (for example, 50 ohms) to be matched to the transmitting antenna.

The oscillator 224' is configured to be generated at a desired frequency, and it can be adjusted in response to an adjustment signal.

The controller 225' enables the oscillator for a transmission phase, and adjusts a frequency of the oscillator, and adjusts an output power level to implement a communication protocol for the purpose of interacting with neighboring devices.

The output unit 226' displays a charged state under the control of the charging pad controller. The output unit can be implemented by a light-emitting device and/or an liquid crystal display (LCD), and the like.

Figure 4:
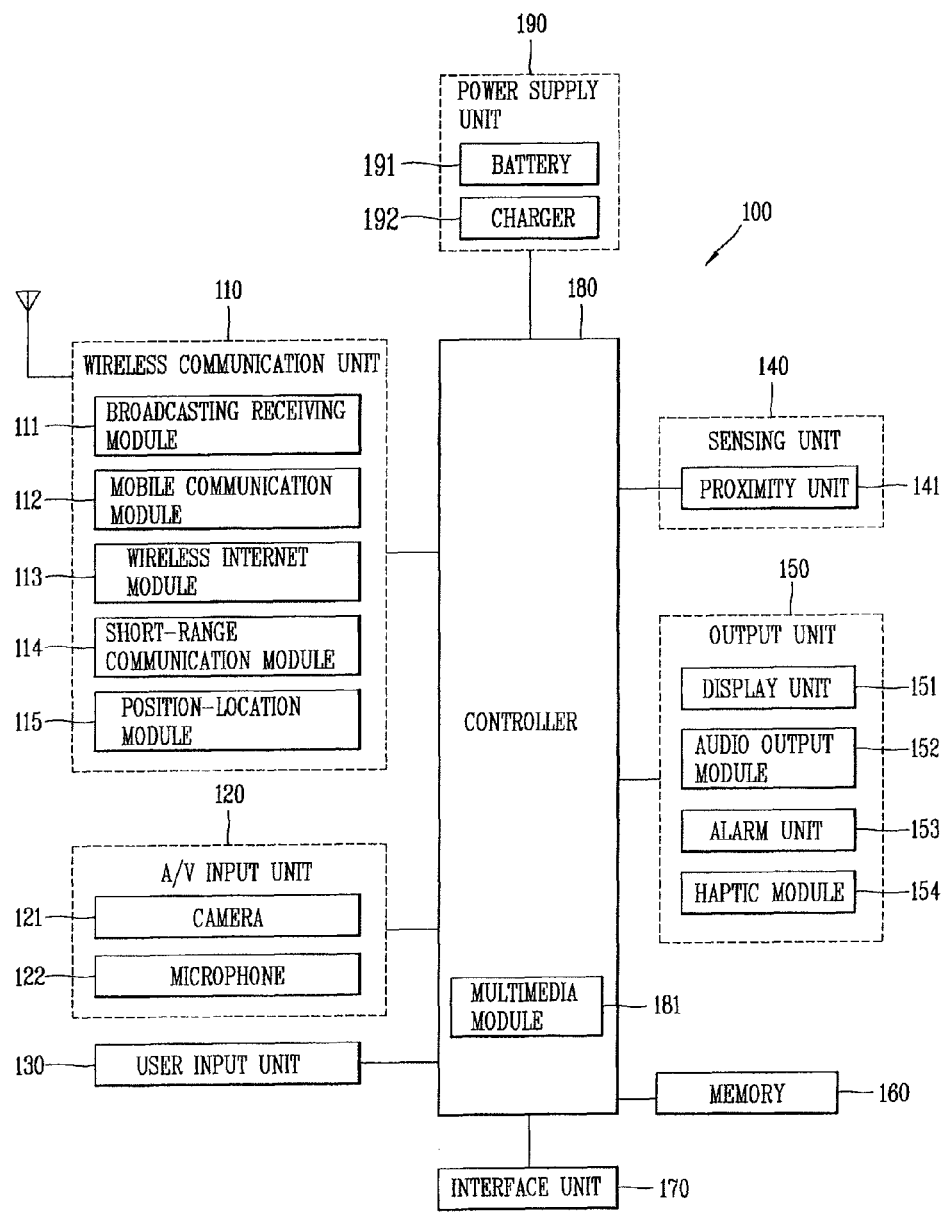
FIG. 4 is a block configuration diagram illustrating a mobile terminal (or terminal) associated with an embodiment of the present disclosure.

FIG. 4 is a block configuration diagram illustrating a mobile terminal (or terminal) associated with an embodiment of the present disclosure.

The mobile terminal can include a wireless charging apparatus of FIG. 2A as described above.

The terminal 100 can include a wireless communication unit 110, an Audio/Video (A/V) input unit 120, a user input unit 130, a sensing unit 140, an output unit 150, a memory 160, an interface unit 170, a controller 180, a power supply unit 190 and the like. FIGS. 3A and 3B illustrate the terminal 100 having various components, but it is understood that implementing all of the illustrated components is not a requirement. Greater or fewer components can alternatively be implemented. Hereinafter, each component is described in sequence.

The wireless communication unit 110 can typically include one or more modules which permit wireless communications between the terminal 100 and a wireless communication system or between the terminal 100 and a network within which the terminal 100 is located. For example, the wireless communication unit 110 can include a broadcast receiving module 111, a mobile communication module 112, a wireless Internet module 113, a short-range communication module 114, a position location module 115 and the like.

The broadcast receiving module 111 receives a broadcast signal and/or broadcast associated information from an external broadcast managing entity via a broadcast channel.

The broadcast channel can include a satellite channel and a terrestrial channel. The broadcast center can indicate a server which generates and transmits a broadcast signal and/or broadcast associated information or a server which receives a pre-generated broadcast signal and/or broadcast associated information and sends them to the portable terminal. The broadcast signal can be implemented as a TV broadcast signal, a radio broadcast signal, and a data broadcast signal, among others. The broadcast signal can further include a data broadcast signal combined with a TV or radio broadcast signal.

Examples of broadcast associated information can include information associated with a broadcast channel, a broadcast program, a broadcast service provider, and the like. The broadcast associated information can be provided via a mobile communication network, and received by the mobile communication module 112.

The broadcast associated information can be implemented in various formats. For instance, broadcast associated information can include Electronic Program Guide (EPG) of Digital Multimedia Broadcasting (DMB), Electronic Service Guide (ESG) of Digital Video Broadcast-Handheld (DVB-H), and the like.

The broadcast receiving module 111 can be configured to receive digital broadcast signals transmitted from various types of broadcast systems. Such broadcast systems can include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 can be configured to be suitable for every broadcast system transmitting broadcast signals as well as the digital broadcasting systems.

Broadcast signals and/or broadcast associated information received via the broadcast receiving module 111 can be stored in a suitable device, such as a memory 160.

The mobile communication module 112 transmits/receives wireless signals to/from at least any one of a base station, an external portable terminal, and a server on a mobile communication network. Here, the wireless signals can include audio call signal, video (telephony) call signal, or various formats of data according to transmission/reception of text/multimedia messages.

The wireless internet module 113 supports wireless Internet access for the portable terminal. This module can be internally or externally coupled to the terminal 100. Examples of such wireless Internet access can include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module can include BLUETOOTH, Radio Frequency IDentification (RFID), Infrared Data Association (IrDA), Ultra-WideBand (UWB), ZigBee, and the like.

The position location module 115 denotes a module for detecting or calculating a position of a portable terminal. An example of the position location module 115 can include a Global Position System (GPS) module.

Referring to FIG. 4, the A/V input unit 120 is configured to provide audio or video signal input to the portable terminal. The A/V input unit 120 can include a camera 121 and a microphone 122. The camera 121 receives and processes image frames of still pictures or video obtained by image sensors in a video call mode or a capturing mode. The processed image frames can be displayed on a display unit 151.

The image frames processed by the camera 121 can be stored in the memory 160 or transmitted to the exterior via the wireless communication unit 110. Two or more cameras 121 can be provided according to the configuration of the portable terminal.

The microphone 122 can receive an external audio signal while the portable terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in the phone call mode. The microphone 122 can include assorted noise removing algorithms to remove noise generated in the course of receiving the external audio signal.

The user input unit 130 can generate input data input by a user to control the operation of the portable terminal. The user input unit 130 can include a keypad, a dome switch, a touchpad (e.g., static pressure/capacitance), a jog wheel, a jog switch and the like.

The sensing unit 140 provides status measurements of various aspects of the portable terminal. For instance, the sensing unit 140 can detect an open/close status of the portable terminal, a change in a location of the terminal 100, a presence or absence of user contact with the terminal 100, the location of the terminal 100, acceleration/deceleration of the terminal 100, and the like, so as to generate a sensing signal for controlling the operation of the terminal 100. For example, regarding a slide-type portable terminal, the sensing unit 140 can sense whether a sliding portion of the portable terminal is open or closed. Other examples include sensing functions, such as the sensing unit 140 sensing the presence or absence of power provided by the power supply unit 190, the presence or absence of a coupling or other connection between the interface unit 170 and an external device. On the other hand, the sensing unit 140 can include a proximity sensor 141.

The output unit 150 is configured to output an audio signal, a video signal or a tactile signal. The output unit 150 can include a display unit 151, an audio output module 152, an alarm 153, a haptic module 154, and the like.

The display unit 151 can display (output) information processed in the terminal 100. For example, when the portable terminal is operating in a phone call mode, the display unit 151 will provide a User Interface (UI) or a Graphic User Interface (GUI) which includes information associated with the call. As another example, if the portable terminal is in a video call mode or a capturing mode, the display unit 151 can additionally or alternatively display images captured and/or received, UI, or GUI.

The display unit 151 can be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of such displays 151 can be implemented as a transparent type or an optical transparent type through which the exterior is visible, which is referred to as 'transparent display'. A representative example of the transparent display can include a Transparent OLED (TOLED), and the like. The rear surface of the display unit 151 can also be implemented to be optically transparent. Under this configuration, a user can view an object positioned at a rear side of a terminal body through a region occupied by the display unit 151 of the terminal body.

The display unit 151 can be implemented in two or more in number according to a configured aspect of the terminal 100. For instance, a plurality of the display units 151 can be arranged on one surface to be spaced apart from or integrated with each other, or can be arranged on different surfaces.

Here, if the display unit 151 and a touch sensitive sensor (referred to as a touch sensor) have a layered structure therebetween, the structure can be referred to as a touch screen. The display unit 151 can be used as an input device rather than an output device. The touch sensor can be implemented as a touch film, a touch sheet, a touch pad, and the like.

The touch sensor can be configured to convert changes of a pressure applied to a specific part of the display unit 151, or a capacitance occurring from a specific part of the display unit 151, into electric input signals. Also, the touch sensor can be configured to sense not only a touched position and a touched area, but also a touch pressure.

When touch inputs are sensed by the touch sensors, corresponding signals are transmitted to a touch controller. The touch controller processes the received signals, and then transmits corresponding data to the controller 180. Accordingly, the controller 180 can sense which region of the display unit 151 has been touched.

Referring to FIG. 4, a proximity sensor 141 can be arranged at an inner region of the terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor can include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. The touch screen (touch sensor) can be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns can be output onto the touch screen.

The audio output module 152 can output audio data received from the wireless communication unit 110 or stored in the memory 160, in a call-receiving mode, a call-placing mode, a recording mode, a voice recognition mode, a broadcast reception mode, and so on. The audio output module 152 can output audio signals relating to functions performed in the terminal 100, e.g., sound alarming a call received or a message received, and so on. The audio output module 152 can include a receiver, a speaker, a buzzer, and so on.

The alarm 153 outputs signals notifying occurrence of events from the terminal 100. The events occurring from the terminal 100 can include call received, message received, key signal input, touch input, and so on. The alarm 153 can output not only video or audio signals, but also other types of signals such as signals notifying occurrence of events in a vibration manner. Because the video or audio signals can be output through the display unit 151 or the audio output unit 152, the display unit 151 and the audio output module 152 can be categorized into a part of the alarm 153.

The haptic module 154 generates various tactile effects which a user can feel. A representative example of the tactile effects generated by the haptic module 154 includes vibration. Vibration generated by the haptic module 154 can have a controllable intensity, a controllable pattern, and so on. For instance, different vibration can be output in a synthesized manner or in a sequential manner.

The haptic module 154 can generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 can be configured to transmit tactile effects (signals) through a user's direct contact, or a user's muscular sense using a finger or a hand. The haptic module 154 can be implemented in two or more in number according to the configuration of the terminal 100.

The memory 160 can store a program for the processing and control of the controller 180. Alternatively, the memory 160 can temporarily store input/output data (e.g., phonebook data, messages, still images, video and the like). Also, the memory 160 can store data related to various patterns of vibrations and audio output upon the touch input on the touch screen.

Furthermore, the memory 160 can store a wireless charging application downloaded from an application providing server (for example, an app store). The wireless charging application is a program for controlling the wireless charging of a battery, and an incoming call notification mode can be selectively set during wireless charging or at the completion of the wireless charging through the relevant program. Here, the incoming call notification mode relates to a method of outputting a notification signal for allowing the user to recognize when receiving a text message or incoming call. The incoming call notification mode can include a bell sound mode, a vibration mode (manner mode), a silent mode, and the like.

The memory 160 can be implemented using any type of suitable storage medium including a flash memory type, a hard disk type, a multimedia card imcro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the terminal 100 can operate a web storage which performs the storage function of the memory 160 on the Internet.

The interface unit 170 can generally be implemented to interface the portable terminal with external devices. The interface unit 170 can allow a data reception from an external device, a power delivery to each component in the terminal 100, or a data transmission from the terminal 100 to an external device. The interface unit 170 can include, for example, wired/wireless headset ports, external charger ports, wired/wireless data ports, memory card ports, ports for coupling devices having an identification module, audio Input/Output (I/O) ports, video I/O ports, earphone ports, and the like.

The identification module can be configured as a chip for storing various information required to authenticate an authority to use the terminal 100, which can include a User Identity Module (UIM), a Subscriber Identity Module (SIM), and the like. Also, the device having the identification module (hereinafter, referred to as 'identification device') can be implemented in a type of smart card. Hence, the identification device can be coupled to the terminal 100 via a port.

Also, the interface unit can serve as a path for power to be supplied from an external cradle to the terminal 100 when the terminal 100 is connected to the external cradle or as a path for transferring various command signals input from the cradle by a user to the terminal 100. Such various command signals or power input from the cradle can operate as signals for recognizing that the terminal 100 has accurately been mounted to the cradle.

The controller 180 typically controls the overall operations of the terminal 100. For example, the controller 180 performs the control and processing associated with telephony calls, data communications, video calls, and the like. The controller 180 can include a multimedia module 181 which provides multimedia playback. The multimedia module 181 can be configured as part of the controller 180 or as a separate component.

The controller 180 can perform a pattern recognition processing so as to recognize a writing or image drawing input on the touch screen as a text or image.

The controller 180 performs wired or wireless charging according to the user input or internal input. Here, the internal input represents a signal for notifying that an induced current generated from a secondary coil within the terminal has been detected.

The controller 180 checks whether the incoming call notification mode of the terminal is set to a vibration mode while entering a wireless charging mode. If the incoming call notification mode is a vibration mode, then the controller 180 changes the incoming call notification mode that has been set to a vibration mode to a bell sound mode or silent mode based on the predetermined setup information. Then, the controller 180 changes the incoming call notification mode and performs wireless charging for a battery.

The power supply unit 190 provides power used by various components under the control of the controller 180. The provided power can be internal power, external power, or combination thereof.

The power supply unit 190 includes a battery 216 for supplying power to every constituent element of the terminal 100, and the battery 216 can include a charger for performing a wired or wireless charging operation. During wireless charging, the charger can be a wireless charging apparatus (or wireless charging unit) with an induction method or resonance method as illustrated in FIGS. 2 and 3. A battery can be omitted from the wireless charging apparatus (or wireless charging unit).

Various embodiments described herein can be implemented in a computer-readable medium using, for example, software, hardware, or some combination thereof.

For a hardware implementation, the embodiments described herein can be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some instances, such embodiments are implemented by the controller 180.

For software implementation, the embodiments such as procedures and functions can be implemented together with separate software modules each of which performs at least one of functions and operations. The software codes can be implemented with a software application written in any suitable programming language. Also, the software codes can be stored in the memory 160 and executed by the controller 180.

Mode Change in Wireless Charging

Hereinafter, a mode change in wireless charging (particularly, a mode change when a vibration mode is set) will be described in detail.

The mode change proposed in the present disclosure can be applicable to both wireless charging operations with an induction method and a resonance method.

First Embodiment

According to a first embodiment of the present disclosure, there is provided a method of changing the set vibration mode to a bell sound mode or silent mode when placed on the charging pad (namely, when wireless charging is started) in a state that the terminal is set to a vibration mode (manner mode).

Figure 5A:
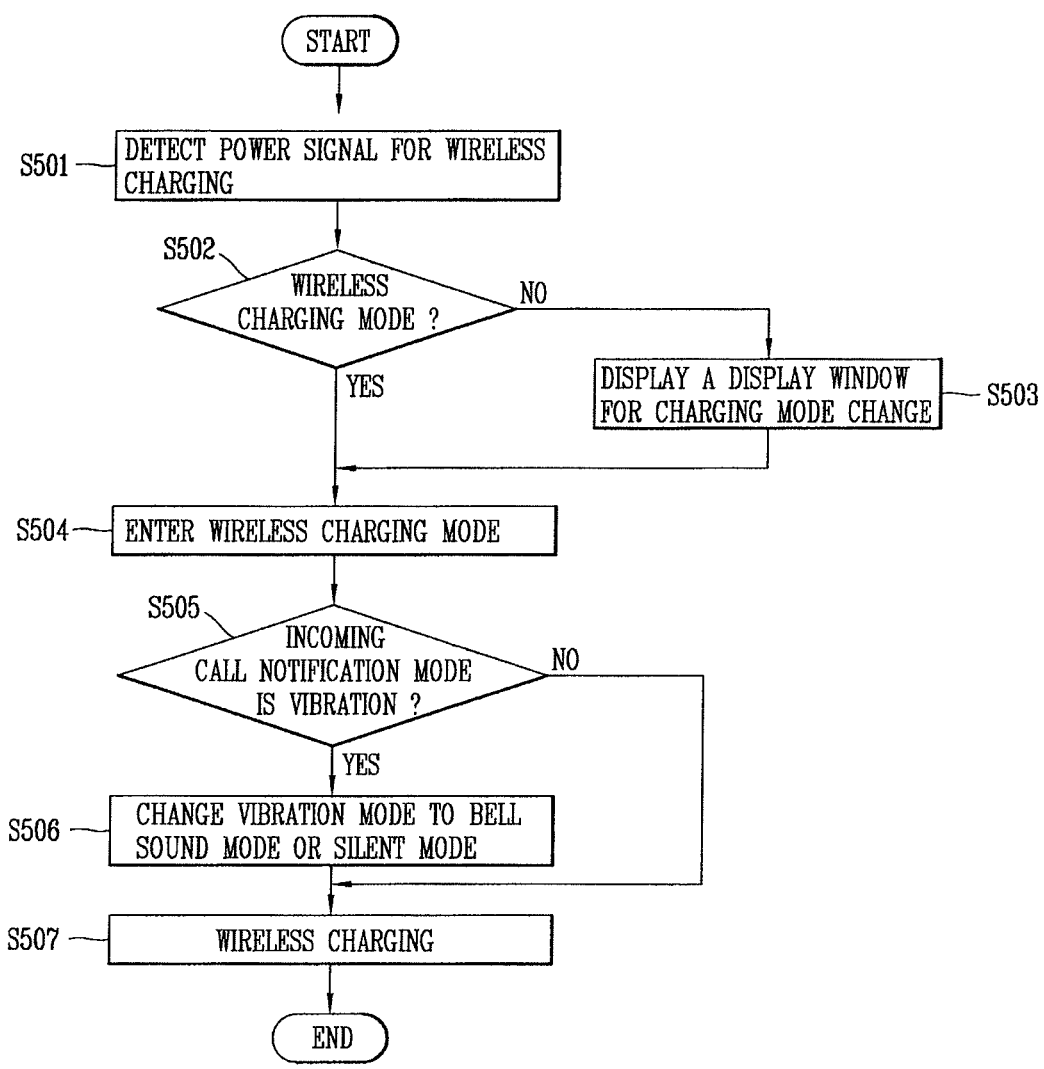
FIG. 5A is a flow chart illustrating a mode change operation in wireless charging according to a first embodiment of the present disclosure.
Figure 5B:
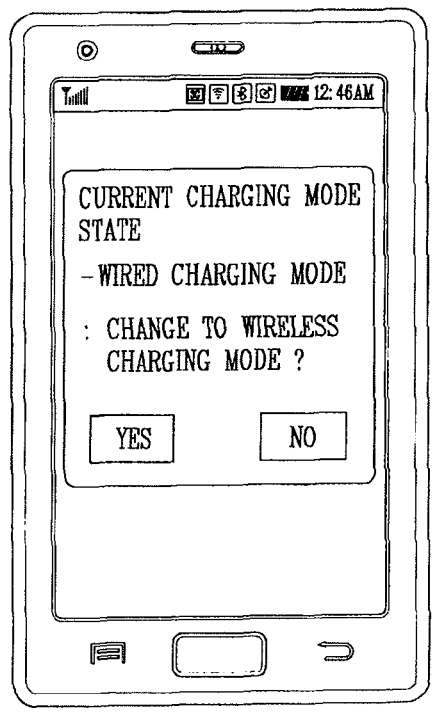
FIG. 5B is a view illustrating a display window for changing a charge mode according to a first embodiment of the present disclosure.
Figure 5C:
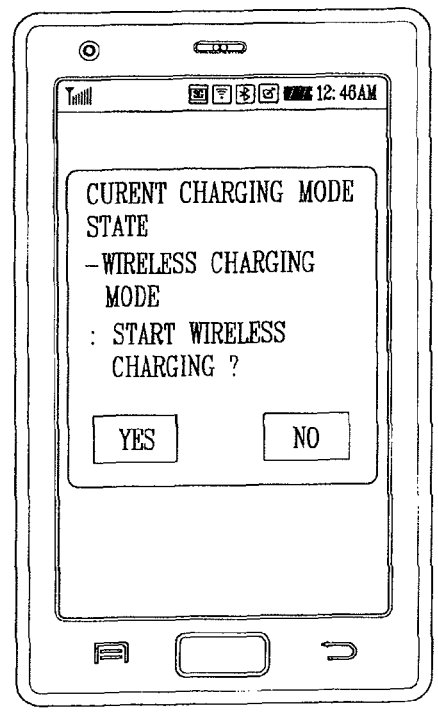
FIG. 5C is a view illustrating a display window for notifying that the terminal is in a wireless charging mode according to a first embodiment of the present disclosure.

FIG. 5A is a flow chart illustrating a mode change operation in wireless charging according to a first embodiment of the present disclosure, FIG. 5B is a view illustrating a display window for changing a charge mode according to a first embodiment of the present disclosure, and FIG. 5C is a view illustrating a display window for notifying that it is in a wireless charging mode according to a first embodiment of the present disclosure.

First, if a power signal for wireless charging is detected from the charging pad (S501), then the controller checks a currently set charging mode (S502). The set charging mode can be a wired charging mode or wireless charging mode.

As a result of checking the charging mode, if the set charging mode is a wired charging mode, then the controller controls the display unit to display a display window for changing the charging mode (S503). In other words, the controller can activate a charging mode change display window with various forms, such as a popup form and the like, on the display unit. The controller controls the terminal to enter a wireless charging mode according to the user's input.

Furthermore, as a result of checking the charging mode, if the set charging mode is a wireless charging mode, then the controller controls the terminal to enter a wireless charging mode.

Here, the controller can provide visual, auditory, or tactile information to notify that the current charging mode is in a wireless charging mode. As an example of the visual information, the controller can display a display window for notifying the wireless charging mode on the display unit.

Next, the controller 180 enters a wireless charging mode according to the user input or internal input (S504). Entering the wireless charging mode represents a start of wireless charging through the charging pad.

When starting wireless charging, the controller 180 checks whether the incoming call notification mode is set to a vibration mode (manner mode) (S505). Here, the incoming call notification mode can include a vibration mode, a bell sound mode, a silent mode, and the like.

If the incoming call notification mode is set to a vibration mode, then the controller 180 controls the set vibration mode to be changed to a bell sound mode or silent mode (S506). The incoming call notification mode can be set in advance by the user or can be previously set in the terminal.

Here, during wireless charging, if the incoming call notification mode is set to a vibration mode, then the controller can check whether the terminal is set to a function of changing the vibration mode to a bell sound mode or silent mode. The incoming call notification mode change can be set by the user.

If the incoming call notification mode change is set, then the controller 180 can change the incoming call notification mode from the vibration mode to a bell sound mode or silent mode based on the predetermined setup information.

However, if the incoming call notification mode change is not set, then the controller 180 can output a message notifying that the vibration mode is used to be manually changed to a bell sound mode or silent mode on the display unit 151. At this time, the controller 180 can output it together with a sound effect. The incoming call notification mode can be changed from the vibration mode to a bell sound mode or silent mode according to the user's input.

The controller 180 can start wireless charging while at the same time entering the wireless charging mode or perform wireless charging subsequent to the incoming call notification mode change (S507).

Figure 6:
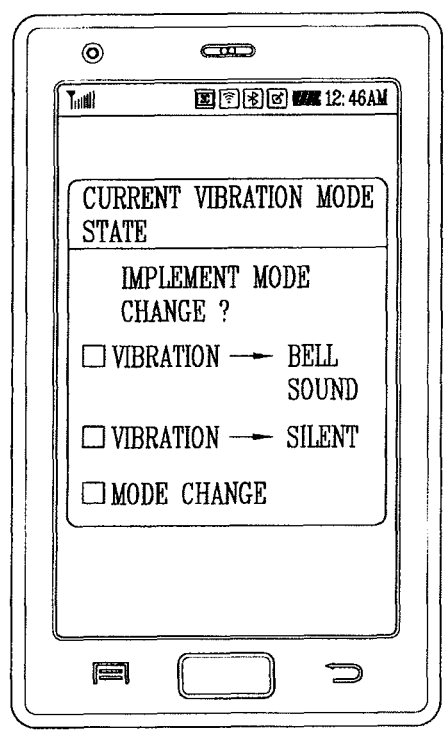
FIG. 6 is a view illustrating that a display window for changing an incoming call notification mode is displayed according to a first embodiment of the present disclosure.

FIG. 6 is a view illustrating that a display window for changing an incoming call notification mode is displayed according to a first embodiment of the present disclosure.

Referring to FIG. 6, if the incoming call notification mode is set to a vibration mode when entering a wireless charging mode (during wireless charging), the controller 180, then the controller 180 can control a display window for changing the incoming call notification mode to be displayed. A current state of the incoming call notification mode and changeable mode information can be displayed on the display window.

As illustrated in FIG. 6, the changeable mode information can include a bell sound mode, a silent mode, and a unchanged mode.

When detecting an input for mode selection from the user, a currently set vibration mode is changed to a mode corresponding to the input.

The input can be a touch on the display screen or when a specific key of the user input unit is selected.

Second Embodiment

According to a second embodiment of the present disclosure, there is provided a method of changing the set vibration mode to a bell sound mode, or silent mode when receiving an event while the terminal performs a wireless charging operation on the charging pad.

Figure 7:
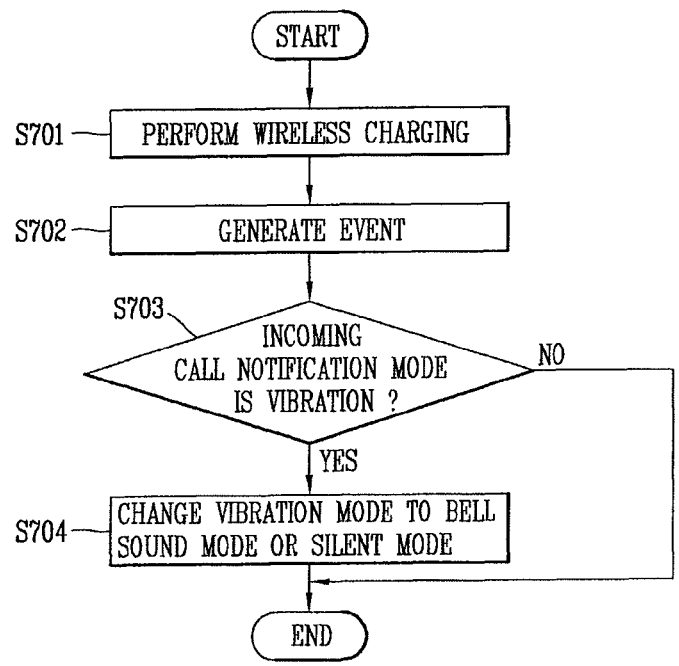
FIG. 7 is a flow chart illustrating a mode change method when an event is generated during wireless charging according to a second embodiment of the present disclosure.

FIG. 7 is a flow chart illustrating a mode change method when an event is generated during wireless charging according to a second embodiment of the present disclosure.

When the generation of an event is detected while performing a wireless charging operation (S701) from the charging pad (S702), the controller 180 checks whether the incoming call notification mode is set to a vibration mode (manner mode) (S703). The wireless charging can be carried out through an induction method or resonance method as described above.

Here, the incoming call notification mode can include a vibration mode, a bell sound mode, and a silent mode. Furthermore, the event generation can be an incoming call reception or SMS message reception. The incoming call can include voice and image signals but is not limited to them.

During the event generation, if the incoming call notification mode is set to a vibration mode, then the controller 180 controls the set vibration mode to be changed to a bell sound mode or silent mode (S704).

The incoming call notification mode can be set in advance by the user or can be previously set in the terminal.

Here, when an event is generated during wireless charging, if the incoming call notification mode is set to a vibration mode, then the controller can check whether the terminal is set to a function of changing the vibration mode to a bell sound mode or silent mode.

If the incoming call notification mode change has been set, then the controller 180 can change the incoming call notification mode from the vibration mode to a bell sound mode or silent mode based on the predetermined setup information.

However, if the incoming call notification mode change has not been set, then the controller 180 can output a message notifying that the vibration mode is used to be manually changed to a bell sound mode or silent mode on the display unit 151. At this time, the controller 180 can output it together with a sound effect.

Figure 8:
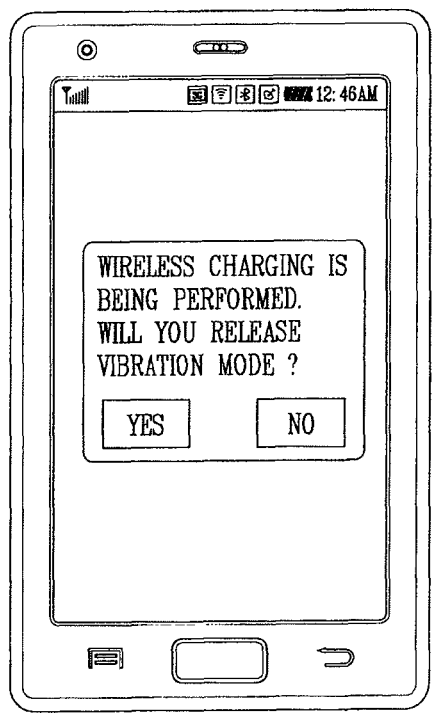
FIG. 8 is a view illustrating a display window for changing an incoming call notification mode when an event is generated during wireless charging according to a second embodiment of the present disclosure.

FIG. 8 is a view illustrating a display window for changing an incoming call notification mode when an event is generated during wireless charging according to a second embodiment of the present disclosure.

The incoming call notification mode can be changed from the vibration mode to a bell sound mode or silent mode according to the user's input.

Third Embodiment

According to a third embodiment of the present disclosure, there is provided a method for changing a vibration mode to a silent mode, and notifying an incoming call reception through the charging pad when the terminal receives an incoming call (call or message from the outside) during wireless charging on the charging pad.

Figure 9:
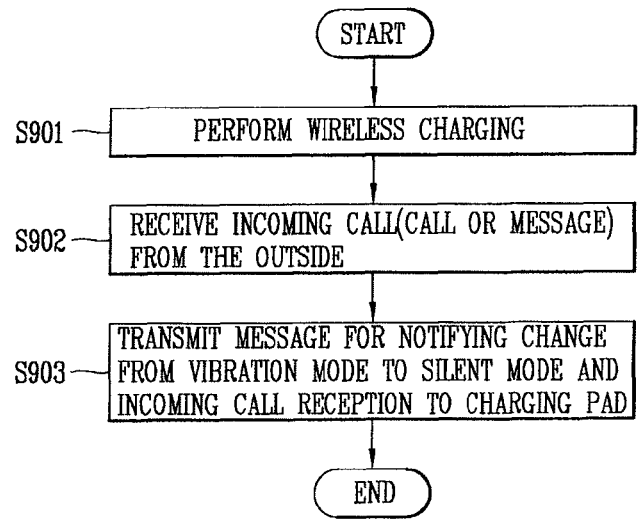
FIG. 9 is a flow chart illustrating a mode change method when an incoming call is received during wireless charging according to a third embodiment of the present disclosure.

FIG. 9 is a flow chart illustrating a mode change method when an incoming call is received during wireless charging according to a third embodiment of the present disclosure.

If an incoming call from the outside is received while performing a wireless charging operation (S901) from the charging pad (S902), the controller 180 checks whether the current incoming call notification mode is set to a vibration mode (manner mode) (S903).

Then, the controller controls the wireless communication unit to transmit a message for notifying an incoming call reception from the outside to the charging pad (S903). The message for notifying an incoming call reception can be transmitted through a short-range communication method (for example, Bluetooth, Wi-Fi, etc.), 3G, WiMAX, and an LTE(A) communication method.

Here, if the charging pad has received a message for notifying an incoming call reception from the terminal, then the charging pad can notify the incoming call reception through a visual, auditory, or tactile method.

Furthermore, if the controller receives a response to the message for notifying an incoming call reception from the charging pad, then the controller can control a speaker phone to be activated.

Fourth Embodiment

According to a fourth embodiment of the present disclosure, there is provided a method of restoring the incoming call notification mode that has been changed during wireless charging to a vibration mode when wireless charging through the charging pad has been completed.

Figure 10:
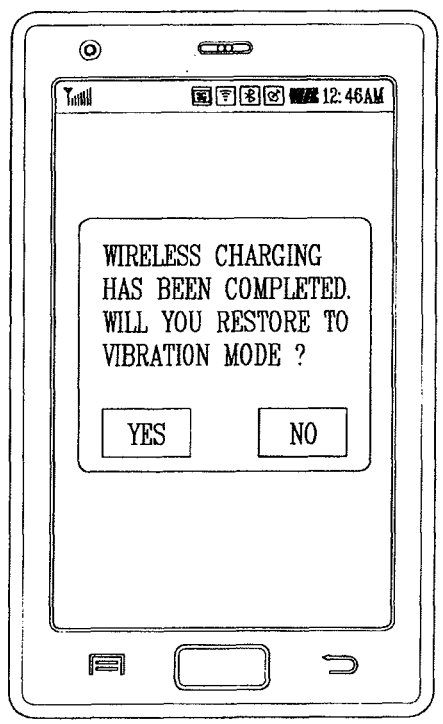
FIG. 10 is a view illustrating a display window for notifying vibration mode restoration when wireless charging has been completed according to a fourth embodiment of the present disclosure.

FIG. 10 is a view illustrating a display window for notifying vibration mode restoration when wireless charging has been completed according to a fourth embodiment of the present disclosure.

When wireless charging through the charging pad has been completed, the controller 180 checks whether the incoming call notification mode has been changed due to the generation of an event on the charging pad. Here, the event generation can be a wireless charging start or incoming call reception from the outside.

As a result of the check, if the incoming call notification mode is changed, then the controller controls the incoming call notification mode that has been changed due to the event generation to display a display window for restoring an incoming call notification mode prior to the change.

In other words, referring to FIG. 10, when wireless charging through the charging pad has been completed, it is seen that a display window for restoring the incoming call notification mode that has been changed due to a wireless charging start or incoming call reception from the outside to a vibration mode is displayed on the display unit.

According to the present disclosure, when a terminal is set to a vibration mode during wireless charging, the vibration mode is changed to a bell sound mode or silent mode, thereby preventing the location of the terminal from being changed on the charging pad due to vibration generated from the terminal. Accordingly, it can be possible to maintain the same charging efficiency until battery charging is completed.

Furthermore, according to the present disclosure, when an incoming call is received from the outside during wireless charging, whether or not the incoming call has been received is allowed to know through a charging pad, thereby reducing the consumption of a battery of the terminal while performing a wireless charging operation.

In addition, according to the present disclosure, subsequent to the completion of wireless charging, the incoming call notification mode is restored to an incoming call notification mode prior to change, thereby having an effect of enhancing the user convenience.

Furthermore, according to an embodiment of the present invention, the foregoing method can be implemented as codes readable by a computer on a medium written by the program. The computer-readable media includes all types of recording devices in which data readable by a computer system can be stored. Examples of the computer-readable media can include ROM, RAM, CD-ROM, magnetic tape, floppy disk, and optical data storage device, and the like, and also include a device implemented via a carrier wave (for example, a transmission via the Internet). The computer can include the controller 180 of the terminal.

The configurations and methods according to the above-described embodiments will not be applicable in a limited way to the foregoing terminal, and all or part of each embodiment can be selectively combined and configured to make various modifications thereto.

What is claimed is:

1. A terminal, comprising:
   a wireless charger configured to wirelessly receive a power signal from a wireless power transmitter to charge power;
   a wireless communication unit; and
   a controller configured to detect a wireless power signal, determine an incoming call notification mode of the terminal, and change the incoming call notification mode to a non-vibration mode when the incoming call notification mode is a vibration mode so as to maintain the distance when the wireless charger receives the wireless power signal,
   wherein the controller controls a display window for changing a charging mode to be displayed when a preset charging mode is a wired charging mode, and the display window for notifying a current charging mode state to be displayed when the preset charging mode is a wireless charging mode,
   wherein the controller controls the wireless communication unit to change the incoming call notification mode to the non-vibration mode and transmit a message for notifying an event generation to the wireless power transmitter,
   wherein the controller controls the wireless communication unit to receive a response to the message from the wireless power transmitter, and
   wherein the controller controls a speaker phone to be activated when receiving a response to the message from the wireless power transmitter, and the event generation is an incoming call reception.

2. A terminal, comprising:
   a wireless charger configured to wirelessly receive a power signal from a wireless power transmitter to charge power, wherein the wireless charger charges power through an induction method;
   a wireless communication unit; and
   a controller configured to detect a wireless power signal and control an incoming call notification mode to be changed from a vibration mode to an audible mode or a silent mode when an event is generated on the wireless power transmitter,
   a display unit, wherein the controller controls the display unit to display a display window for changing the incoming call notification,
   wherein the controller controls a display window for changing a charging mode to be displayed when a preset charging mode is a wired charging mode, and the display window for notifying a current charging mode state to be displayed when the preset charging mode is a wireless charging mode,
   wherein the controller controls the wireless communication unit to change the incoming call notification mode to the silent mode and transmit a message for notifying the event generation to the wireless power transmitter,
   wherein the controller controls the wireless communication unit to receive a response to the message from the wireless power transmitter, and
   wherein the controller controls a speaker phone to be activated when receiving a response to the message from the wireless power transmitter, and the event generation is an incoming call reception.

3. The terminal of claim 2, wherein the change in the incoming notification mode is performed one of prior to the event being generated or after the event being generated, and
   wherein the event is any one of an incoming call reception, a message reception, and a wireless charging start.

4. The terminal of claim 2, wherein the message is transmitted to the wireless power transmitter through a Bluetooth communication method.

5. The terminal of claim 2, wherein the controller controls the audible mode or the silent mode to be restored to the vibration mode when the wireless power signal is no longer detected.

6. The terminal of claim 2, wherein the controller controls the wireless communication unit to transmit a message for notifying the event to the wireless power transmitter.

7. The terminal of claim 2, wherein the controller controls the wireless communication unit to transmit a signal for the wireless power transmitter to output a notification signal.

\* \* \* \* \*